US012354405B1

(12) United States Patent
Liu et al.

(10) Patent No.: US 12,354,405 B1
(45) Date of Patent: Jul. 8, 2025

(54) EXPRESSION RECOGNITION METHOD AND SYSTEM BASED ON MULTI-SCALE FEATURES AND SPATIAL ATTENTION

(71) Applicant: YANTAI UNIVERSITY, Yantai (CN)

(72) Inventors: Zhaowei Liu, Yantai (CN); Haonan Wen, Yantai (CN); Yongchao Song, Yantai (CN); Wenhan Hou, Yantai (CN); Xinxin Zhao, Yantai (CN); Tengjiang Wang, Yantai (CN); Diantong Liu, Yantai (CN); Weiqing Yan, Yantai (CN); Peng Song, Yantai (CN); Anzuo Jiang, Yantai (CN); Hang Su, Yantai (CN)

(73) Assignee: YANTAI UNIVERSITY, Yantai (CN)

( * ) Notice: Subject to any disclaimer, the term of this patent is extended or adjusted under 35 U.S.C. 154(b) by 0 days.

(21) Appl. No.: 19/061,635

(22) Filed: Feb. 24, 2025

Related U.S. Application Data

(63) Continuation of application No. PCT/CN2024/135203, filed on Nov. 28, 2024.

(30) Foreign Application Priority Data

Jun. 4, 2024 (CN) .......................... 202410710860.8

(51) Int. Cl.
*G06V 40/16* (2022.01)
*G06V 10/82* (2022.01)

(52) U.S. Cl.
CPC ............ *G06V 40/175* (2022.01); *G06V 10/82* (2022.01); *G06V 40/171* (2022.01)

(58) Field of Classification Search
CPC .. G06V 40/175; G06V 40/174; G06V 40/176; G06V 10/82; G06V 40/171
See application file for complete search history.

(56) References Cited

U.S. PATENT DOCUMENTS

| 2023/0290134 A1* | 9/2023 | Hu ..................... G06V 10/7715 |
| 2024/0338974 A1* | 10/2024 | Lee ..................... G06V 40/176 |
| 2025/0111696 A1* | 4/2025 | Jiang ..................... G06V 10/42 |

FOREIGN PATENT DOCUMENTS

| CN | 113781385 A | 12/2021 |
| CN | 117058734 A | 11/2023 |
| CN | 117275074 A | 12/2023 |

\* cited by examiner

*Primary Examiner* — Phuoc Tran
(74) *Attorney, Agent, or Firm* — Nitin Kaushik

(57) ABSTRACT

The present invention relates to the technical field of expression recognition, and in particular, to an expression recognition method and system based on multi-scale features and spatial attention. The method includes: performing feature extraction on acquired facial image data by using an HNFER neural network model to obtain an original input feature map; performing pooling and concatenation on extracted features based on a CoordAtt attention mechanism to obtain a feature map; performing deep convolution processing on the feature map to obtain an attention map, and then performing element-by-element multiplication to obtain a final feature map; and performing feature transformation and normalization on the final feature map to obtain an expression category probability and output the expression category probability. In the present invention, by integrating scale perception and spatial attention technologies, the model can recognize and classify different emotional states more accurately and maintain high performance even under complex environmental conditions.

10 Claims, 6 Drawing Sheets

EXPRESSION RECOGNITION METHOD AND SYSTEM BASED ON MULTI-SCALE FEATURES AND SPATIAL ATTENTION

CROSS-REFERENCE TO RELATED APPLICATIONS

The application claims priority to Chinese patent application No. 2024107108608, filed on Jun. 4, 2024, the entire contents of which are incorporated herein by reference.

TECHNICAL FIELD

The present invention relates to the technical field of expression recognition, and in particular, to an expression recognition method and system based on multi-scale features and spatial attention.

BACKGROUND

Facial Expression Recognition (FER) technology is mainly applied in the fields of human-computer interaction, sentiment analysis, etc. With the development of computer vision, especially the application of deep learning technology, the accuracy and application range of FER have been significantly expanded. Although current technologies have enabled efficient recognition of emotional states, there are still challenges in dealing with complex scenarios such as lighting changes and facial occlusions.

FER in the prior art faces challenges in complex and diverse scenarios. Especially, when dealing with different lighting, expression intensities, and facial occlusions, conventional FER methods are often ineffective. In addition, the conventional methods have limitations in extracting and processing subtle facial expression changes, making it difficult to accurately capture and recognize variable emotional expressions of humans.

Secondly, differences in the expression intensities make it difficult for tiny expressions to be accurately captured and processed by the conventional methods, which poses a challenge in recognizing slight and transient changes in facial expressions. Moreover, the facial occlusions such as wearing glasses and masks, or hand occlusions may cause part of facial features to be lost, further increasing the difficulty of recognition. The conventional FER methods often rely on a static and global feature extraction mode when dealing with these complex scenarios, and lack dynamic attention to local features, making it difficult to cope with variable emotional expressions and complex practical application environments.

SUMMARY

In order to solve the above-mentioned problems, the present invention provides an expression recognition method and system based on multi-scale features and spatial attention, where a new FER framework HNFER is proposed, which enhances the accuracy and robustness of recognition through multi-scale feature extraction and spatial attention mechanisms.

In a first aspect, the present invention provides an expression recognition method based on multi-scale features and spatial attention, adopting the following technical solution:

An expression recognition method based on multi-scale features and spatial attention, including:
acquiring facial image data;
constructing an HNFER neural network model;
performing feature extraction on acquired facial image data by using the HNFER neural network model to obtain an original input feature map;
performing pooling and concatenation on extracted features based on a CoordAtt attention mechanism to obtain a feature map;
performing deep convolution processing on the feature map to obtain an attention map, and then performing element-by-element multiplication to obtain a final feature map; and
performing feature transformation and normalization on the final feature map to obtain an expression category probability and output the expression category probability.

Further, the performing feature extraction on acquired facial image data by using the HNFER neural network model includes: performing three stages of feature extraction on the facial image data to transform a facial image with a size of H×W×3 to a facial image with a size of H/4×W/4×256, where His a height, and W is a width.

Further, the performing pooling and concatenation on extracted features based on a CoordAtt attention mechanism to obtain a feature map includes: performing horizontal pooling and vertical pooling on the extracted features by the CoordAtt attention mechanism of the HNFER neural network model, respectively, and performing concatenation on pooled features to generate attention weights that act on a height and a width of the original input feature map, respectively.

Further, the performing deep convolution processing on the feature map to obtain an attention map includes: generating 512 feature maps from a feature map processed by CoordAtt through a convolutional layer, where a size of each feature map is transformed to H/4×W/4×512; and processing the feature maps through spatial weights at different scales based on an SAFM mechanism of the model to obtain convolutionally processed feature maps.

Further, the performing element-by-element multiplication to obtain a final feature map includes: restoring the convolutionally processed feature maps to an original resolution through upsampling, and concatenating with a feature map at a first scale, and after concatenating, generating an attention map through feature fusion, and performing element-by-element multiplication on the attention map and the original input feature map to enhance spatial features at multiple scales and obtain the final feature map.

Further, the performing feature transformation and normalization on the final feature map to obtain an expression category probability includes: generating 1024 feature maps from the final feature map through a convolutional layer, where a size of each feature map is transformed to H/4×W/4×1024; then, sequentially performing feature transformation on the feature maps through two fully connected layers, and outputting 6 nodes through a third fully connected layer to correspond to 6 expressions.

Further, the performing feature transformation and normalization on the final feature map to obtain an expression category probability further includes: using a softmax function to convert values of the 6 nodes that are output into probabilities, representing probabilities that images belong to each expression category.

In a second aspect, an expression recognition system based on multi-scale features and spatial attention, including:
- a data acquisition module, configured to acquire facial image data;
- a modeling module, configured to construct an HNFER neural network model;
- a feature extraction module, configured to perform feature extraction on acquired facial image data by using the HNFER neural network model to obtain an original input feature map;
- a feature concatenation module, configured to perform pooling and concatenation on extracted features based on a CoordAtt attention mechanism to obtain a feature map;
- a convolution module, configured to perform deep convolution processing on the feature map to obtain an attention map, and then perform element-by-element multiplication to obtain a final feature map; and
- a calculation module, configured to perform feature transformation and normalization on the final feature map to obtain an expression category probability and output the expression category probability.

In a third aspect, the present invention provides a computer-readable storage medium, having a plurality of instructions stored therein, where the instructions are adapted to be loaded by a processor of a terminal device and to execute an expression recognition method based on multi-scale features and spatial attention described above.

In a fourth aspect, the present invention provides a terminal device, including a processor and a computer-readable storage medium, the processor being used for implementing various instructions, and the computer-readable storage medium being used for storing a plurality of instructions, where the instructions are adapted to be loaded by the processor and to execute an expression recognition method based on multi-scale features and spatial attention described above.

In summary, the present invention has the following beneficial technical effects:

In the present invention, by integrating scale perception and spatial attention technologies, the model can recognize and classify different emotional states more accurately and maintain high performance even under complex environmental conditions. A deep learning architecture of the network improves the accuracy and robustness of emotion recognition, especially for expression recognition in multicultural environments and under different lighting conditions. Through the enhanced feature extraction and optimized classification process, the model has wider application prospects and better user experience in practical applications such as the fields of human-computer interaction, security systems, and health diagnosis.

DETAILED DESCRIPTION OF THE EMBODIMENTS

The present invention is further detailed below with reference to the accompanying drawings.

Embodiment 1

Figure 1:
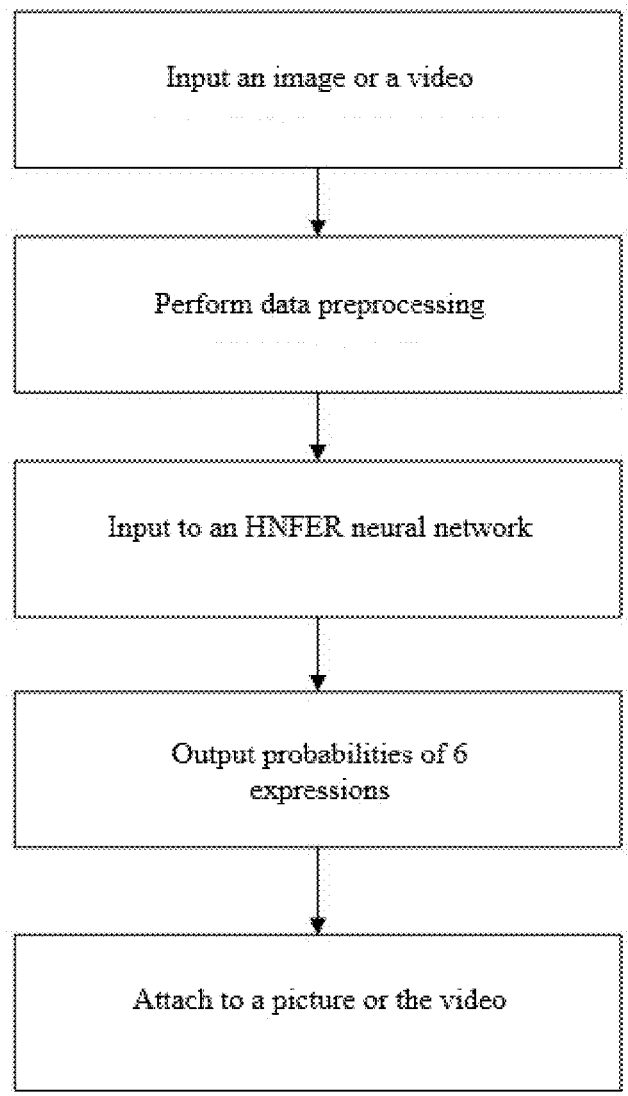
FIG. 1 is a schematic diagram of an expression recognition method based on multi-scale features and spatial attention according to Embodiment 1 of the present invention.
Figure 2:
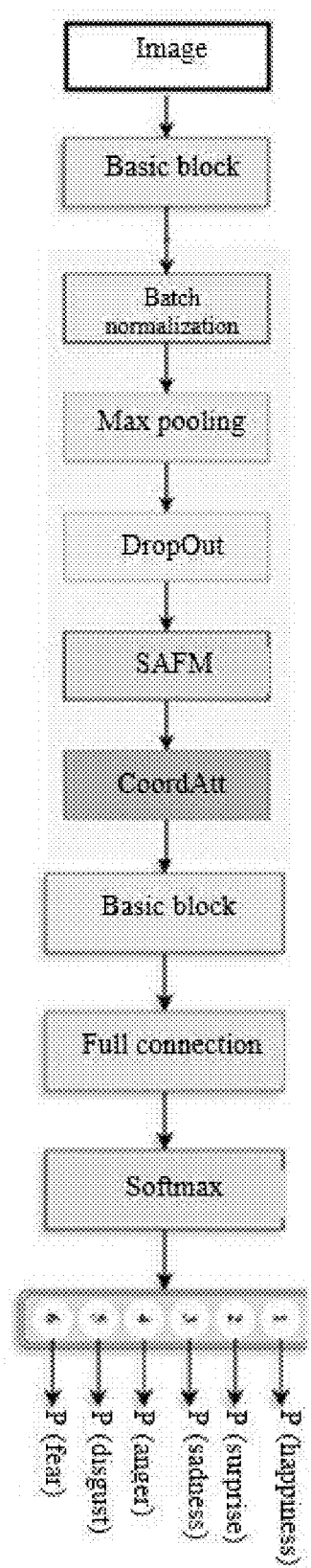
FIG. 2 is a schematic structural diagram of a neural network according to Embodiment 1 of the present invention.

Referring to FIG. 1, an expression recognition method based on multi-scale features and spatial attention according to this embodiment includes the following steps:

S1. acquiring facial image data.

In this embodiment, a plurality of standard data sets are used as a source of experimental data, including FER2013, RAF-DB, FER GIMEFIVE, and DISFA data sets. In order to improve the effect of FER, acquired facial images are usually differentiated by categories. Specifically, images will be labeled according to expression categories such as happiness, sadness, anger, surprise, fear, and disgust. The number of images in each category needs to be large enough to ensure that the model can learn features of each category during training. These data sets provide a large number of well-labeled facial expression images, covering different lighting conditions, facial poses, and expression intensities, with high diversity and complexity. As shown in Table 1, these image databases are classified by folders to obtain specific numbers of training, test, and validation sets for each emotion category.

TABLE 1

Details of data sets

| Data set | Divided into | Expression | | | | | | Total number of pictures |
| --- | --- | --- | --- | --- | --- | --- | --- | --- |
| | | Happiness | Surprise | Sadness | Anger | Disgust | Fear | |
| FER2013 | Training set | 7215 | 3171 | 4830 | 3995 | 436 | 4097 | 23743 |
| | Test set | 1774 | 831 | 1247 | 958 | 111 | 1024 | 5945 |
| RAF-DB | Training set | 4772 | 1290 | 1982 | 705 | 717 | 281 | 9747 |
| | Test set | 1185 | 329 | 478 | 162 | 160 | 74 | 2388 |

TABLE 1-continued

Details of data sets

| Data set | Divided into | Expression | | | | | | Total number of pictures |
|---|---|---|---|---|---|---|---|---|
| | | Happiness | Surprise | Sadness | Anger | Disgust | Fear | |
| FER GIMEFIVE | Training set | 15187 | 8619 | 11923 | 7996 | 3729 | 7619 | 55073 |
| | Test set | 2959 | 1160 | 1725 | 1120 | 271 | 1098 | 8333 |
| | Validation set | 100 | 100 | 100 | 100 | 100 | 100 | 600 |
| DISFA | Test set | — | — | — | — | — | — | 54 |

S2. Constructing an HNFER neural network model, including:

1. Initial input of image

A facial image is input, with a size of H×W×3, representing height, width, and three color channels (RGB).

Figure 3:
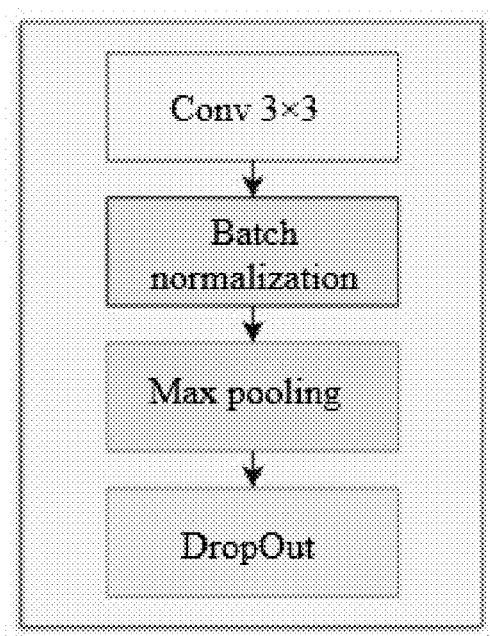
FIG. 3 is a schematic diagram of a basic module according to Embodiment 1 of the present invention.

2. First-stage feature extraction, performing feature extraction by using a basic module, as shown in FIG. 3, (1) 64 feature maps are generated from the image through a first convolutional layer (Conv 3×3), where a size of each feature map is transformed to (H×W×64).

(2) These features are standardized by batch normalization (BatchNorm) to eliminate statistical differences among different batches.

(3) Then, a max pooling (MaxPool 2×2) operation is performed to reduce the size of the feature maps to (H/2×W/2×64).

(4) Afterwards, DropOut (dropout 0.2) is applied for regularization to prevent overfitting.

3. Second-stage feature extraction (1) 128 feature maps are generated from the above output through a second convolutional layer (Conv 3×3), where a size of each feature map is transformed to (H/2×W/2×128).

(2) Batch normalization and max pooling are performed again to further reduce the size of the feature maps to (H/4×W/4×128).

(3) DropOut (dropout 0.2) is applied again for regularization.

4. Third-stage feature extraction (1) 256 feature maps are generated from the above output through a third convolutional layer (Conv 3×3), where a size of each feature map is transformed to (H/4×W/4×256).

(2) Batch normalization is applied to perform standardization.

Figure 5:
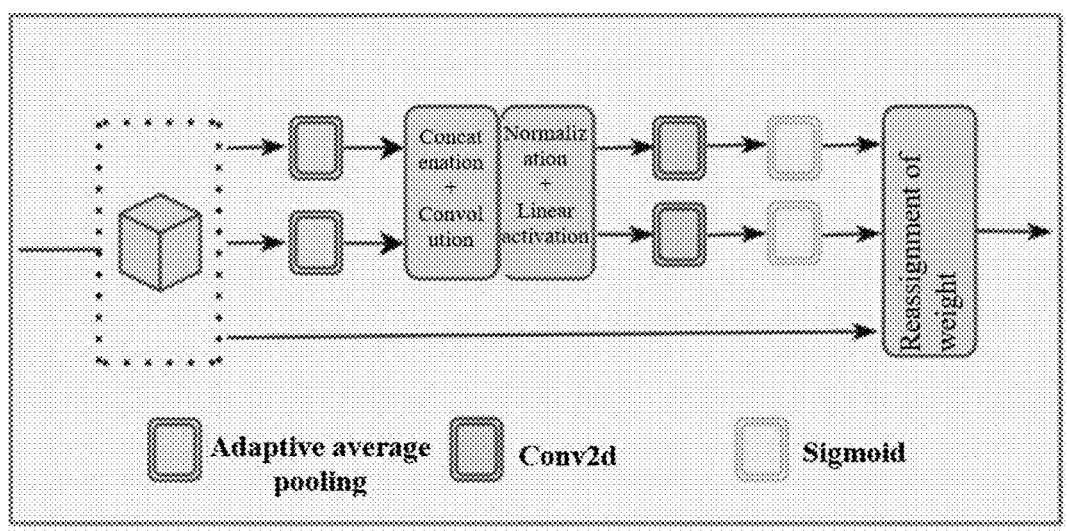
FIG. 5 is a schematic diagram of a CoordAtt module according to Embodiment 1 of the present invention.

5. CoordAtt attention mechanism, as shown in FIG. 5, (1) These 256 feature maps are processed by a CoordAtt module which generates horizontal and vertical attention weights through adaptive average pooling.

(2) Horizontal pooling is performed to compress the feature maps along a width direction to generate features with a size of (H/4×1×256).

(3) Vertical pooling is performed to compress the feature maps along a height direction to generate features with a size of (1×W/4×256) and transpose the features to (W/4×1×256).

(4) These features are concatenated and subjected to a series of convolution and activation operations to generate attention weights, which act on height and width dimensions of an original feature map, respectively.

(5) The attention weights are applied to the input feature map to enhance relevant features in the image and obtain a new feature map.

6. Fourth-stage feature extraction (1) 512 feature maps are generated from the feature map processed by CoordAtt through a fourth convolutional layer (Conv 3×3), where a size of each feature map is transformed to (H/4×W/4×512).

(2) Batch normalization is performed again.

Figure 4:
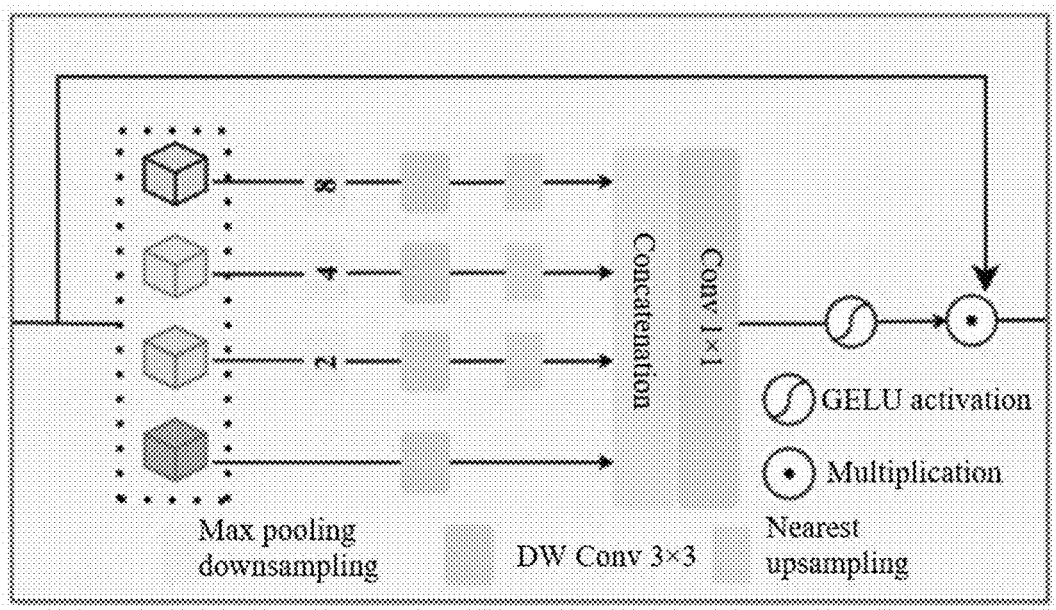
FIG. 4 is a schematic diagram of an SFAM module according to Embodiment 1 of the present invention.

7. SAFM module, as shown in FIG. 4, (1) The 512 feature maps are processed by an SAFM module which processes the feature maps with spatial weights at different scales.

(2) Firstly, the 512 feature maps are divided into 4 scales (128 feature maps per scale), with a size of (H/4×W/4×128).

(3) The first scale is kept at the original resolution and subjected to deep convolution processing.

(4) The second, third, and fourth scales are downsampled by max pooling, with resolutions reduced to ½, ¼, and ⅛ of their original values, respectively, and then subjected to deep convolution processing.

(5) The feature maps after being subjected to deep convolution processing are restored to the original resolutions by upsampling, and are concatenated with the feature maps at the first scale.

(6) Concatenated feature maps are subjected to feature fusion through 1×1 convolution, and are subjected to non-linear transformation by using an activation function (GELU) to generate an attention map.

(7) The attention map and the original input feature map are subjected to element-by-element multiplication to enhance the multi-scale spatial features and obtain a final feature map.

8. Fifth-stage feature extraction (1) 1024 feature maps are generated from the feature map processed by SAFM through a fifth convolutional layer (Conv 3×3), where a size of each feature map is transformed to (H/4×W/4×1024).

(2) These feature maps are subjected to batch normalization once again.

9. Classification of fully connected layers (1) The feature maps are converted to a fixed size of (1×1×1024) through adaptive average pooling (AdaptiveAvgPool 1×1).

(2) The feature maps are flattened into a vector with a size of (1024).

(3) Feature transformation is performed through a first fully connected layer (Linear 1024→2048).

(4) DropOut (dropout 0.5) is applied for regularization to prevent overfitting.

(5) Feature transformation is performed through a second fully connected layer (Linear 2048→1024).

(6) The last fully connected layer (Linear 1024→6) outputs 6 nodes corresponding to 6 expression categories.

10. Softmax normalization

Finally, by using a softmax function, values of output nodes are converted into probabilities, representing probabilities that images belong to each expression category.

11. Final output

The system outputs a vector containing 6 probability values, representing the probability that the input image belongs to each of the following 6 expressions: happiness, sadness, anger, surprise, fear, and disgust.

S3. Performing facial recognition on facial images by using the constructed HNFER model (1) In an initial stage of FER, the HNFER model first processes 3-channel 64×64 resolution images that are input. These images are usually color images, with each channel representing three color channels: red, green, and blue (RGB). With a plurality of convolutional layers, the model scans the images layer by layer by using a 3×3 convolution kernel, so as to extract local features. These convolutional layers can capture low-level features such as edges and textures in the images to form a feature map (Feature Map). The output of the convolutional layers is processed by an activation function (e.g., ReLU), which allows nonlinear features to be preserved and enhances the expression ability of the model. Subsequently, a max pooling layer reduces the dimension of the feature maps by performing a maximum operation on the feature maps. This not only reduces the amount of calculation, but also enhances the spatial invariance of the model, making the model more robust to deformations such as displacement and rotation.

(2) The coordinate attention mechanism (CoordAtt) further enhances the feature extraction capability of the model based on the convolutional layers. When CoordAtt is applied, the model aggregates features in a vertical (Y-axis) direction and a horizontal (X-axis) direction, respectively, to generate two independent attention maps. These two attention maps represent the importance of the features in different directions. By weighting the original feature map, facial regions critical for emotion recognition are highlighted. For example, when recognizing smiles of people, the features of the corners of the mouth may be more important than those of the forehead, so CoordAtt gives higher weight to a region of the corners of the mouth. This process improves the sensitivity of the model to facial details and local features, enhancing its ability to recognize complex emotional expressions.

(3) In addition, a spatial feature aggregation module (SAFM) further enhances the feature extraction capability of the model by processing feature maps at different scales. SAFM first performs downsampling and upsampling at different scales. The downsampling enables the model to capture global context information by reducing the resolution of the feature map, while the upsampling enables the model to capture detailed information by increasing the resolution of the feature map. For example, in a downsampling process, the feature map may be reduced from 64×64 to 32×32, which allows the model to see a larger range of image content; and in an upsampling process, the feature map is restored from 32×32 to 64×64, which allows the model to focus on more subtle facial changes. Finally, these multi-scale features are aggregated together through 1×1 convolution, which ensures that the model can capture both details and context information simultaneously, thereby understanding the complex emotional changes in facial expressions more accurately.

(4) At the tail of the model, global average pooling is used to perform global-wide averaging operation on each feature map, enabling two-dimensional feature maps to be converted into one-dimensional feature vectors. This step not only reduces the number of parameters and avoids overfitting, but also preserves global information of the features. Subsequently, a plurality of fully connected layers further process these feature vectors and map the features to emotion categories through linear transformations. To prevent overfitting, the model introduces a Dropout layer among the fully connected layers, which enhances the generalization ability of the model by randomly dropping a portion of neurons. Such structural design allows a GiMeFive model to significantly improve the accuracy in recognizing subtle emotional changes while maintaining efficient calculation, making it highly suitable for emotion recognition applications that require high precision and real-time response.

(5) The softmax function plays a crucial role in a final stage of the neural network. This function first performs an exponential operation on logit of each category, and then divides these exponentiated values by a sum of exponential values of all the categories to normalize the probabilities of different categories. This calculation process helps to accurately determine a predicted probability of each category. Essentially, the softmax function converts a K-dimensional vector of arbitrary real numbers into another K-dimensional vector of real numbers, where each element in the vector lies between 0 and 1. This conversion allows components of the output vector to be interpreted as probability distributions. For example, the probability distributions for the 6 categories of happiness, sadness, anger, surprise, fear, and disgust are output: [0.142, 0.387, 0.259, 0.167, 0.026, 0.019], and each element in the output vector lies between 0 and 1, with a sum equal to 1, representing the predicted probability of each category. Ultimately, a recognition result is determined by the category with the highest probability, i.e., in the above example, the model predicts a first category as the result of emotion recognition. In this way, the softmax function ensures that the model can accurately output the predicted probability of each emotion category.

$$\sigma(Z)_j = \frac{e^{Z_j}}{\sum_{k=1}^{K} e^{Z_k}}$$

In the formula, j represents a specific category out of the total number of categories K, where j=1, 2, . . . , K. Specifically, Zj is a log odds of a jth category, a real valued fraction converted into probability. Zk refers to the log odds of all categories k, where k varies from 1 to K. In this setup, the probability of a real category is set to 1 (the real category) and the probability of all other categories is set to 0.

(6) All models use a cross-entropy (CE) as a loss function, which is a commonly used method for multi-category classification in a training process. A formula for the CE loss function is as follows:

$$L_{CE} = -\sum_{i=1}^{n} y_i \log(p_i)$$

In the formula, $y_i$ is a real label of a category i, and $p_i$ is a predicted probability of the category i. n represents the total number of categories, which in this study were six facial expression categories: anger, disgust, fear, happiness, sadness, and surprise.

Experimental Validation

A novel FER framework HNFER was used, and experiments were conducted on a plurality of standard data sets to validate its performance. These data sets included FER2013, RAF-DB, and custom FER GIMEFIVE and DISFA data sets. Through these experiments, the HNFER framework demonstrates its significant advantages in FER tasks, especially in dealing with complex situations. Table 2 shows a comparison between results of HNFER and other models.

TABLE 2

Comparison between results of HNFER and other models

| Data set | Model | Parameter amount | Accuracy (%) | | |
| --- | --- | --- | --- | --- | --- |
| | | | Training set | Test set | Validation set |
| FER2013 | VGG | 72460742 | 72.5 | 51.3 | 36.4 |
| | ResNet18 | 11179590 | 98.0 | 65.5 | 43.6 |
| | ResNet34 | 21287750 | 97.0 | 65.9 | 43.9 |
| | GIMEFIVE | 10478086 | 69.7 | 67.5 | 46.2 |
| | HNFER | 10752542 | 90.1 | 69.8 | 47.0 |
| RAF-DB | VGG | 72460742 | 96.2 | 81.4 | 71.1 |
| | ResNet18 | 11179590 | 100.0 | 84.2 | 73.4 |
| | ResNet34 | 21287750 | 99.9 | 83.4 | 72.5 |
| | GIMEFIVE | 10478086 | 97.0 | 86.5 | 78.1 |
| | HNFER | 10752542 | 98.6 | 86.1 | 76.8 |
| FER GIMEFIVE | VGG | 72460742 | 85.6 | 48.3 | 57.5 |
| | ResNet18 | 11179590 | 98.5 | 70.6 | 72.2 |
| | ResNet34 | 21287750 | 98.0 | 71.6 | 73.2 |
| | GIMEFIVE | 10478086 | 84.9 | 75.3 | 75.0 |
| | HNFER | 10752542 | 93.5 | 75.2 | 76.9 |

First, the FER2013 data set, as a recognized benchmark data set, contains 35,887 grayscale images labeled with seven different expression categories. These images were captured in a field environment, covering various lighting conditions and head postures. The HNFER framework has the performance on this data set superior to that of most existing methods, due to its ability to effectively deal with lighting changes and posture deviations. Through multi-scale feature extraction of the SAFM module, HNFER can capture multi-level facial features ranging from coarse to fine, while a spatial attention mechanism of the CoordAtt module ensures high sensitivity and accurate recognition of key expression features.

Next, RAF-DB, as a more modern large-scale facial expression database, provides higher image quality and more complex expression classification. The application of HNFER on RAF-DB demonstrates its excellent performance, especially the advantages when dealing with mixed expressions. This can be attributed to the comprehensive feature processing capability of the HNFER framework, which not only focuses on a single expression, but also accurately recognizes expressions compounded by multiple emotions.

In addition, the custom FER GIMEFIVE data set integrates five data sets from different sources and is intended to test the generalization ability of the model in diverse environments. The HNFER framework demonstrates its excellent generalization ability and high accuracy on this data set, which proves its ability to maintain stability and high performance under diverse inputs.

Finally, the DISFA data set provides facial expression data in a video format, which is used for further researching and validating the ability of the model to process video data. The HNFER framework can effectively utilize temporal information in continuous video frames, and further improves the accuracy and real-time performance of recognition through dynamic feature extraction.

Figure 6:
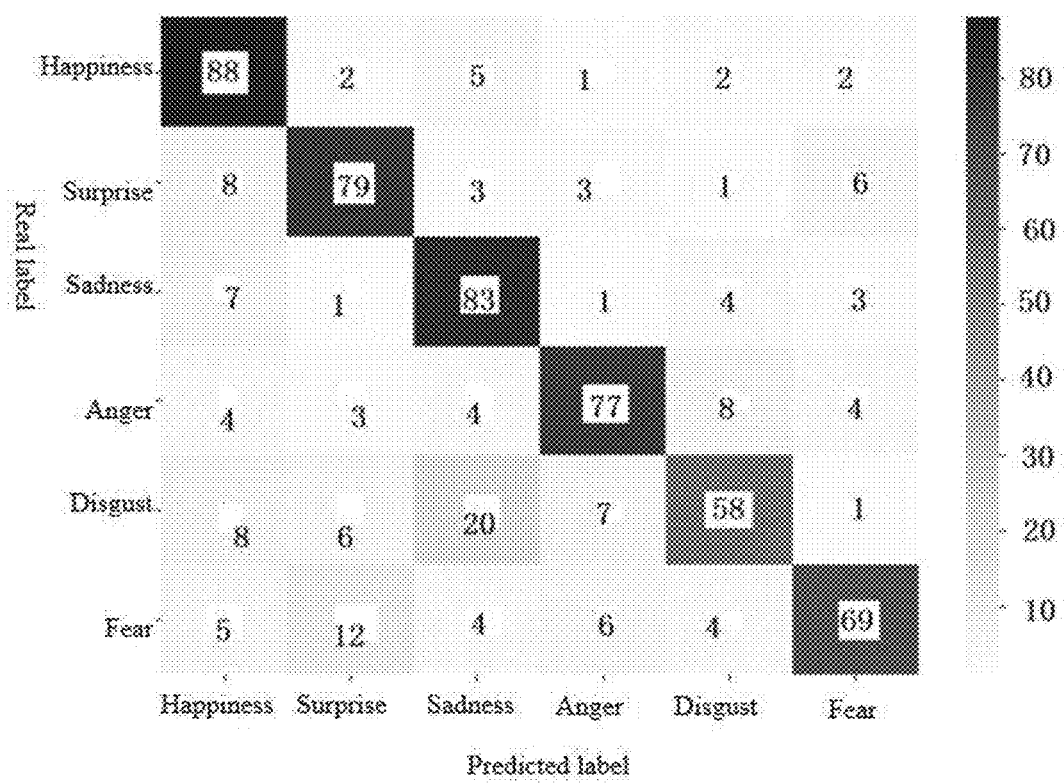
FIG. 6 is a confusion matrix heat map according to Embodiment 1 of the present invention.

In order to comprehensively understand the images that are correctly classified in total, a confusion matrix heat map is also generated, as shown in FIG. 6, to visualize the performance of the model on each emotion category. The number on the diagonal of the heat map represents the number of correctly predicted images on the validation set. The sum of each row is 100, as the validation set contains 100 images with real labels for each category.

Embodiment 2

This embodiment provides an expression recognition system based on multi-scale features and spatial attention, including:
a data acquisition module, configured to acquire facial image data;
a modeling module, configured to construct an HNFER neural network model;
a feature extraction module, configured to perform feature extraction on acquired facial image data by using the HNFER neural network model to obtain an original input feature map;
a feature concatenation module, configured to perform pooling and concatenation on extracted features based on a CoordAtt attention mechanism to obtain a feature map;
a convolution module, configured to perform deep convolution processing on the feature map to obtain an attention map, and then perform element-by-element multiplication to obtain a final feature map; and
a calculation module, configured to perform feature transformation and normalization on the final feature map to obtain an expression category probability and output the expression category probability.

A computer-readable storage medium, having a plurality of instructions stored therein, where the instructions are adapted to be loaded by a processor of a terminal device and to execute the method.

A terminal device, including a processor and a computer-readable storage medium, the processor being used for implementing various instructions, and the computer-readable storage medium being used for storing a plurality of instructions, where the instructions are adapted to be loaded by the processor and to execute the method.

The above are preferred embodiments of the present invention and are not intended to limit the scope of protection of the present invention. Therefore, any equivalent changes made according to the structure, shape, and principle of the present invention shall fall within the scope of protection of the present invention.

What is claimed is:

1. An expression recognition method based on multi-scale features and spatial attention, comprising:
acquiring facial image data;
constructing an HNFER neural network model;
performing feature extraction on acquired facial image data by using the HNFER neural network model to obtain an original input feature map;

performing pooling and concatenation on extracted features based on a CoordAtt attention mechanism to obtain a feature map;

performing deep convolution processing on the feature map to obtain an attention map, and then performing element-by-element multiplication to obtain a final feature map; and performing feature transformation and normalization on the final feature map to obtain an expression category probability and output the expression category probability.

2. The expression recognition method based on multi-scale features and spatial attention according to claim 1, wherein the performing feature extraction on acquired facial image data by using the HNFER neural network model comprises: performing three stages of feature extraction on the facial image data to transform a facial image with a size of H×W×3 to a facial image with a size of H/4×W/4×256, wherein H is a height, and W is a width.

3. The expression recognition method based on multi-scale features and spatial attention according to claim 2, wherein the performing pooling and concatenation on extracted features based on a CoordAtt attention mechanism to obtain a feature map comprises: performing horizontal pooling and vertical pooling on the extracted features by the CoordAtt attention mechanism of the HNFER neural network model, respectively, and performing concatenation on pooled features to generate attention weights that act on a height and a width of the original input feature map, respectively.

4. The expression recognition method based on multi-scale features and spatial attention according to claim 3, wherein the performing deep convolution processing on the feature map to obtain an attention map comprises: generating 512 feature maps from a feature map processed by CoordAtt through a convolutional layer, wherein a size of each feature map is transformed to H/4×W/4×512; and processing the feature maps through spatial weights at different scales based on an SAFM mechanism of the model to obtain convolutionally processed feature maps.

5. The expression recognition method based on multi-scale features and spatial attention according to claim 4, wherein the performing element-by-element multiplication to obtain a final feature map comprises: restoring the convolutionally processed feature maps to an original resolution through upsampling, and concatenating with a feature map at a first scale, and after concatenating, generating an attention map through feature fusion, and performing element-by-element multiplication on the attention map and the original input feature map to enhance spatial features at multiple scales and obtain the final feature map.

6. The expression recognition method based on multi-scale features and spatial attention according to claim 5, wherein the performing feature transformation and normalization on the final feature map to obtain an expression category probability comprises: generating 1024 feature maps from the final feature map through a convolutional layer, wherein a size of each feature map is transformed to H/4×W/4×1024; then, sequentially performing feature transformation on the feature maps through two fully connected layers, and outputting 6 nodes through a third fully connected layer to correspond to 6 expressions.

7. The expression recognition method based on multi-scale features and spatial attention according to claim 6, wherein the performing feature transformation and normalization on the final feature map to obtain an expression category probability further comprises: using a softmax function to convert values of the 6 nodes that are output into probabilities, representing probabilities that images belong to each expression category.

8. An expression recognition system based on multi-scale features and spatial attention, comprising:

a data acquisition module, configured to acquire facial image data;

a modeling module, configured to construct an HNFER neural network model;

a feature extraction module, configured to perform feature extraction on acquired facial image data by using the HNFER neural network model to obtain an original input feature map;

a feature concatenation module, configured to perform pooling and concatenation on extracted features based on a CoordAtt attention mechanism to obtain a feature map;

a convolution module, configured to perform deep convolution processing on the feature map to obtain an attention map, and then perform element-by-element multiplication to obtain a final feature map; and a calculation module, configured to perform feature transformation and normalization on the final feature map to obtain an expression category probability and output the expression category probability.

9. A non-transitory computer-readable storage medium, having a plurality of instructions stored therein, wherein the instructions are adapted to be loaded by a processor of a terminal device and to execute an expression recognition method based on multi-scale features and spatial attention according to claim 1.

10. A terminal device, comprising a processor and a computer-readable storage medium, the processor being used for implementing various instructions, and the computer-readable storage medium being used for storing a plurality of instructions, wherein the instructions are adapted to be loaded by the processor and to execute an expression recognition method based on multi-scale features and spatial attention according to claim 1.

* * * * *